United States Patent
Nachlieli et al.

(10) Patent No.: US 8,031,961 B2
(45) Date of Patent: Oct. 4, 2011

(54) FACE AND SKIN SENSITIVE IMAGE ENHANCEMENT

(75) Inventors: Hila Nachlieli, Haifa (IL); Gitit Ruckenstein, Haifa (IL); Darryl Greig, Fishponds (GB); Doron Shaked, Tivon (IL); Ruth Bergman, Haifa (IL); Carl Staelin, Haifa (IL); Shlomo Harush, Nes-Ziona (IL); Mani Fischer, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 1110 days.

(21) Appl. No.: 11/754,711

(22) Filed: May 29, 2007

(65) Prior Publication Data
US 2008/0298704 A1 Dec. 4, 2008

(51) Int. Cl.
*G06K 9/40* (2006.01)
*G06K 9/46* (2006.01)

(52) U.S. Cl. ........................................ 382/254; 382/190
(58) Field of Classification Search .................. 382/162, 382/190, 254, 261, 274
See application file for complete search history.

(56) References Cited

U.S. PATENT DOCUMENTS

| | | | |
|---|---|---|---|
| 5,710,833 A | 1/1998 | Moghaddam et al. | |
| 6,249,315 B1 | 6/2001 | Holm | |
| 6,665,448 B1 | 12/2003 | Maurer | |
| 6,813,041 B1 | 11/2004 | Moroney et al. | |
| 6,845,181 B2 | 1/2005 | Dupin et al. | |
| 7,092,573 B2 * | 8/2006 | Luo et al. | 382/228 |
| 7,099,510 B2 | 8/2006 | Jones et al. | |
| 7,187,788 B2 | 3/2007 | Simon et al. | |
| 7,412,105 B2 * | 8/2008 | Wilensky | 382/254 |
| 7,466,868 B2 * | 12/2008 | Wilensky | 382/254 |
| 7,609,908 B2 * | 10/2009 | Luo et al. | 382/274 |
| 2002/0150291 A1 | 10/2002 | Naf | |
| 2002/0172419 A1 | 11/2002 | Lin et al. | |
| 2003/0108245 A1 | 6/2003 | Gallagher et al. | |
| 2003/0108250 A1 | 6/2003 | Luo | |
| 2004/0071352 A1 | 4/2004 | Mizoguchi | |
| 2005/0117783 A1 * | 6/2005 | Sung et al. | 382/118 |
| 2005/0244074 A1 | 11/2005 | Shaked et al. | |

FOREIGN PATENT DOCUMENTS

JP 2006065688 A 3/2006

OTHER PUBLICATIONS

International Search Report received iin counterpart PCT Application No. PCT/US2008/006474.

(Continued)

*Primary Examiner* — Stephen Koziol (57) ABSTRACT

Systems and methods of face and skin sensitive image enhancement are disclosed. In one aspect, a face map that includes for each pixel of an input image a respective face probability value indicating a degree to which the pixel corresponds to a human face is calculated. A skin map that includes for each pixel of the input image a respective skin probability value indicating a degree to which the pixel corresponds to human skin is ascertained. The input image is enhanced with an enhancement level that varies pixel-by-pixel in accordance with the respective face probability values and the respective skin probability values. In another aspect, a facial content measurement value indicating a degree to which an input image contains human face content is ascertained. A tone-correction process is tuned in accordance with the facial content measurement value. The input image is enhanced in accordance with the tuned tone-correction process.

29 Claims, 6 Drawing Sheets

OTHER PUBLICATIONS

Michael Jones et al., "Fast Multi-view Face Detection," Mitsubishi Electric Research Laboratories, TR2003-96, pp. 1-10, Jul. 2003.

Colour-Science, http://www.colour-science.com/Index_introduction.htm, downloaded Mar. 27, 2007.

Tommer Leyvand, Tommer Leyvand Homepage, http://www.cs.tau.ac.il/~tommer/, 3 pages, downloaded Mar. 27, 2007.

Tommer Leyvand, "Digital Face Beautification,"http://www.cs.tau.ac.il/~tommer/beautification/, 3 pages, downloaded Mar. 27, 2007.

Óscar Martinez Bailac, "Semantic Retrieval of Memory Color Content," PhD Thesis, Universitat Autonoma de Barcelona, 2004.

Facial Attractiveness: Beauty and the Machine. Y. Eisenthal, G. Dror, E.Ruppin. Neural Computation, 18(1), 119-142, 2006.

Viola, P & Jones, M, "Robust Real-Time Face Detection", International Journal of Computer Vision 57(2), 137-154, 2004.

\* cited by examiner

FACE AND SKIN SENSITIVE IMAGE ENHANCEMENT

BACKGROUND

Image enhancement involves one or more processes that are designed to improve the visual appearance of an image. Typical image enhancement processes include sharpening, noise reduction, scene balancing, and tone-correction.

Global or otherwise unguided application of image enhancement processes typically does not produce satisfactory results because the enhancements that are desired by most observers of an image typically vary with image content. For example, it generally is desirable to sharpen image content, such as trees, grass, and other objects containing interesting texture, edge or boundary features, but it is undesirable to sharpen certain features of human faces (e.g., wrinkles and blemishes). Conversely, it typically is desirable to smooth wrinkles and blemishes on human faces, but it is undesirable to smooth other types of image content, such as trees, grass, and other objects containing interesting texture, edge or boundary features.

In an effort to avoid the undesirable effects of global or unguided image enhancement, various manual image enhancement approaches have been developed to enable selective application of image enhancement processes to various image content regions in an image. Some of these approaches rely on manual selection of the image content regions and the desired image enhancement process: Most manual image enhancement systems of this type, however, require a substantial investment of money, time, and effort before they can be used to manually enhance images. Even after a user has become proficient at using a manual image enhancement system, the process of enhancing images is typically time-consuming and labor-intensive.

Automatic image enhancement approaches for avoiding the undesirable effects of global or unguided image enhancement also have been developed. Some of these approaches automatically create maps of local attributes such as noise or sharpness estimations, and gain local control over enhancement parameters based on those maps. Other approaches typically rely on automatic region-based image enhancement. In accordance with one automatic region-based image enhancement approach, the amount of image enhancement is determined automatically for each region in an image based on the subject matter content in the region. In this process, a respective probability distribution is computed for each type of targeted subject matter content across the image. Each probability distribution indicates for each pixel the probability that the pixel belongs to the target subject matter. Each probability distribution is thresholded to identify candidate subject matter regions. Each of the candidate subject matter regions is subjected to a unique characteristics analysis that determines the probability that the region belongs to the target subject matter. The unique characteristics analysis process generates a belief map of detected target subject matter regions and assigns to each of the detected regions an associated probability indicating the probability that the region belongs to the target subject matter. A given belief map only relates to one type of subject matter and the pixels in any given one of the detected subject matter regions in a belief map are assigned the same probability value. Since region detection, as good as it may be, is prone to some errors, the probability discontinuities between the detected subject matter regions and other regions in each belief map necessarily produce artifacts in the resulting enhanced image. For example, if a face region is detected and enhanced using a parameter that is different from the parameter used for the rest of the body, artifacts will most probably be created in border regions. In addition, reality does not always support subject matter regions but rather a continuous change from region to region. This is most evident and most important in terms of avoiding artifacts for image sub-regions requiring drastically different enhancement types, for example, it typically is desirable to smooth facial skin areas and sharpen facial features, such as eyes and lips.

What are needed are image enhancement approaches that avoid artifacts and other undesirable problems that arise as a result of enhancing an image based on segmentations of the image into discrete subject matter regions. Image enhancement systems and methods that are capable of enhancing images in face and skin sensitive ways also are needed.

SUMMARY

In one aspect, the invention features a method in accordance with which a face map is calculated. The face map includes for each pixel of an input image a respective face probability value indicating a degree to which the pixel corresponds to a human face, where variations in the face probability values are continuous across the face map. A skin map is ascertained. The skin map includes for each pixel of the input image a respective skin probability value indicating a degree to which the pixel corresponds to human skin. The process of ascertaining the skin map includes mapping all pixels of the input image having similar values to similar respective skin probability values in the skin map. The input image is enhanced with an enhancement level that varies pixel-by-pixel in accordance with the respective face probability values and the respective skin probability values.

In another aspect, the invention features a method in accordance with which a facial content measurement value indicating a degree to which an input image contains human face content is ascertained. A tone-correction process is tuned in accordance with the facial content measurement value. The input image is enhanced in accordance with the tuned tone-correction process.

The invention also features apparatus and machine readable media storing machine-readable instructions causing a machine to implement the methods described above.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale. Elements shown with dashed lines are optional elements in the illustrated embodiments incorporating such elements.

I. Introduction

The embodiments that are described in detail below are capable of enhancing images in face and skin sensitive ways.

At least some of the embodiments that are described in detail below enhance images in ways that avoid artifacts and other undesirable problems that arise as a result of enhancing an image based on segmentations of the image into discrete subject matter regions. These embodiments leverage the inherent fuzziness of pixel-wise face and skin probability maps to implement face and skin sensitive enhancements to an image in a flexible way that more accurately coincides with a typical observer's expectations of the image enhancements that should be applied to different contents of the image.

At least some of the embodiments that are described in detail below are capable of adjusting default control parameters in image-dependent ways. In some of these embodiments, for example, a global contrast enhancement process is tuned in accordance with a determination of the degree to which an image contains human face content in order to achieve automatic face-sensitive enhancement of the image. These embodiments are capable of providing image-dependent enhancements within the framework of existing enhancement processes and, therefore, can be incorporated readily into existing image enhancement systems and processes.

II. A First Exemplary Image Enhancement System Embodiment

A. Overview

Figure 1:
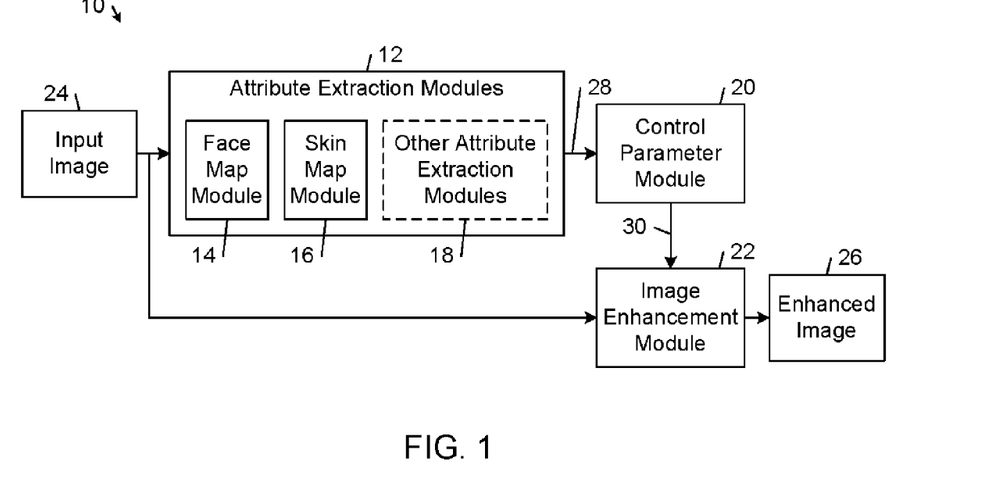
FIG. 1 is a block diagram of an embodiment of an image enhancement system.

FIG. 1 shows an embodiment of an image enhancement system 10 that includes a set 12 of attribute extraction modules, including a face map module 14, a skin map module 16, and possibly one or more other attribute extraction modules 18. The image enhancement system 10 also includes a control parameter module 20 and an image enhancement module 22. In operation, the image enhancement system 10 performs one or more image enhancement operations on an input image 24 to produce an enhanced image 26. In the process of enhancing the input image 24, the attribute extraction modules 14-18 determine respective measurement values 28 based on values of pixels of the input image 24 (e.g., directly from the values of the input image 24 or from pixel values derived from the input image 24). The control parameter module 20 processes the measurement values 28 to produce control parameter values 30, which are used by the image enhancement module 22 to produce the enhanced image 26 from the input image 24.

The input image 24 may correspond to any type of digital image, including an original image (e.g., a video frame, a still image, or a scanned image) that was captured by an image sensor (e.g., a digital video camera, a digital still image camera, or an optical scanner) or a processed (e.g., sub-sampled, filtered, reformatted, scene-balanced or otherwise enhanced or modified) version of such an original image. In some embodiments, the input image 24 is an original full-sized image, the attribute extraction modules 12 process a sub sampled version of the original full-sized image, and the image enhancement module 22 processes is the original full image 24.

Figure 2:
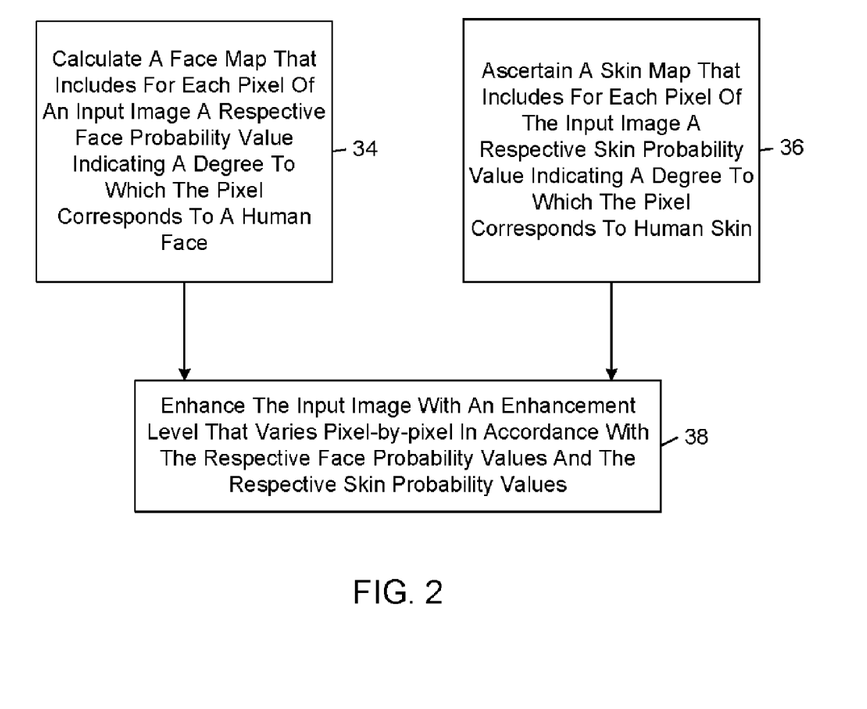
FIG. 2 is a flow diagram of an embodiment of an image enhancement method.

FIG. 2 shows an embodiment of a method that is implemented by the image processing system 10.

In accordance with the method of FIG. 2, the face map module 14 calculates a face map that includes for each pixel of the input image 24 a respective face probability value indicating a degree to which the pixel corresponds to a human face (FIG. 2, block 34). As explained in detail below, variations in the face probability values are continuous across the face map. Thus, the values of neighboring face map pixels are similar. This approach avoids the artifacts and other discontinuities that otherwise might result from a segmentation of the input image 24 into discrete facial regions and non-facial regions.

The skin map module 16 ascertains a skin map that includes for each pixel of the input image a respective skin probability value indicating a degree to which the pixel corresponds to human skin (FIG. 2, block 36). In this process, the skin map module 16 maps all pixels of the input image 24 having similar values to similar respective skin probability values in the skin map. This approach avoids both (i) the artifacts and other discontinuities that otherwise might result from a segmentation of the input image 24 into discrete human-skin toned regions and non-human-skin toned regions, and (ii) artifacts and other discontinuities that otherwise might result from undetected faces or partly detected faces.

It is noted that the order in which the face map module 14 and the skin map module 16 determine the face map and the skin map is immaterial. In some embodiments, the face map module 14 determines the face map before the skin map module 16 determines the skin map. In other embodiments, the skin map module 16 determines the skin map before the face map module 14 determines the face map. In still other embodiments, the face map module 14 and the skin map module 16 determine the face map and the skin map in parallel.

The control parameter module 20 and the image enhancement module 22 cooperatively enhance the input image 24 with an enhancement level that varies pixel-by-pixel in accordance with the respective face probability values and the respective skin probability values (FIG. 2, block 38). The measurement values 28 that are generated by the attribute extraction modules 14-18 are permitted to vary continuously from pixel-to-pixel across the image. This feature allows the control parameter module 20 to flexibly produce the control parameter values 30 in ways that more accurately coincide with a typical observer's expectations of the image enhancements that should be applied to different contents of the image. In this way, the image enhancement module 22 can enhance the input image 24 with an enhancement level that is both face and skin sensitive.

Figure 3:
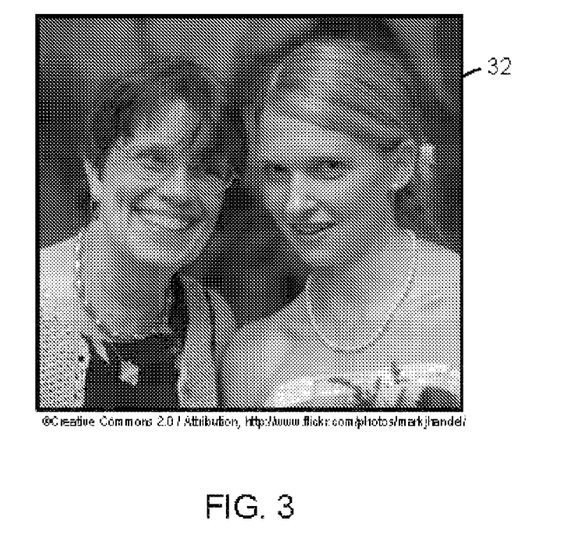
FIG. 3 is an example of an input image.

FIG. 3 shows an example 32 of the input image 24 that contains two human faces. In the following detailed description, the exemplary image 32 and the various image data derived therefrom are used for illustrative purposes only to explain one or more aspects of one or more embodiments of the invention. In some embodiments, the control parameter module 20 produces control parameter values 30 that selectively sharpen non-human-skin toned areas of the input image 32 more than human-skin toned areas and that selectively sharpen human-skin toned areas outside of human faces more than human-skin toned areas inside human faces. Thus, in accordance with a typical observer's desired results, non-human-skin toned features (e.g., eyes, lips, hairline, trees, and grass) inside and outside human faces can be sharpened aggressively, human-skin toned features (e.g., autumn leaves and dry grass) outside of human faces can be sharpened less aggressively, and human-skin toned features within human faces can be sharpened still less aggressively or not at all.

B. Calculating Face Maps

1. Overview

As explained above, the face map module 14 calculates a face map that includes for each pixel of the input image 24 a respective face probability value indicating a degree to which the pixel corresponds to a human face (FIG. 2, block 34). A characteristic feature of the face map is that the variations in the face probability values are continuous across the face map. As used herein, the term "continuous" means having the property that the absolute value of the numerical difference between the value at a given point and the value at any point in a neighborhood of the given point can be made as close to zero as desired by choosing the neighborhood small enough.

In general, the face map module 14 may calculate the face probability values indicating the degrees to which the input image pixels correspond to human face content in a wide variety of different ways, including but not limited to template-matching techniques, normalized correlation techniques, and eigenspace decomposition techniques. In some embodiments, the face map module 14 initially calculates the probabilities that patches (i.e., areas of pixels) of the input image 24 correspond to a human face and then calculates a pixel-wise face map from the patch probabilities (e.g., by assigning to each pixel the highest probability of any patch that contains the pixel).

The embodiments that are described in detail below include a face detection module that rejects patches part-way through an image patch evaluation process in which the population of patches classified as "faces" are progressively more and more likely to correspond to facial areas of the input image as the evaluation continues. The face probability generator 44 uses the exit point of the evaluation process as a measure of certainty that a patch is a face.

2. Single-View Based Face Map Generation

Figure 4:
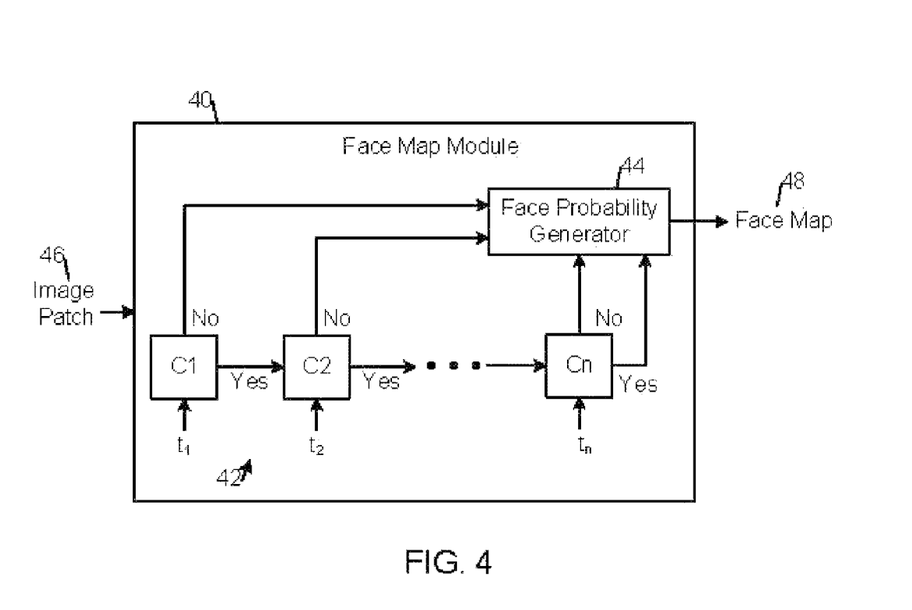
FIG. 4 is a block diagram of an embodiment of the face map module shown in FIG. 1.

FIG. 4 shows an embodiment 40 of the face map module 14 that includes a cascade 42 of classification stages ($C_1$, $C_2$, ..., $C_n$, where n has an integer value greater than 1) (also referred to herein as "classifiers") and a face probability generator 44. In operation, each of the classification stages performs a binary discrimination function that classifies a patch 46 that is derived from the input image 24 into a face class ("Yes") or a non-face class ("No") based on a discrimination measure that is computed from one or more attributes of the image patch 44. The discrimination function of each classification stage typically is designed to detect faces in a single pose or facial view (e.g., frontal upright faces). Depending on the evaluation results produced by the cascade 42, the face probability generator 44 assigns a respective face probability value to each pixel of the input image 24 and stores the assigned face probability value in a face map 48.

Each classification stage $C_i$ of the cascade 42 has a respective classification boundary that is controlled by a respective threshold $t_i$, where i=1, ..., n. The value of the computed discrimination measure relative to the corresponding threshold determines the class into which the image patch 46 will be classified by each classification stage. For example, if the discrimination measure that is computed for the image patch 46 is above the threshold for a classification stage, the image patch 46 is classified into the face class (Yes) whereas, if the computed discrimination measure is below the threshold, the image patch 46 is classified into the non-face class (No).

Figure 5:
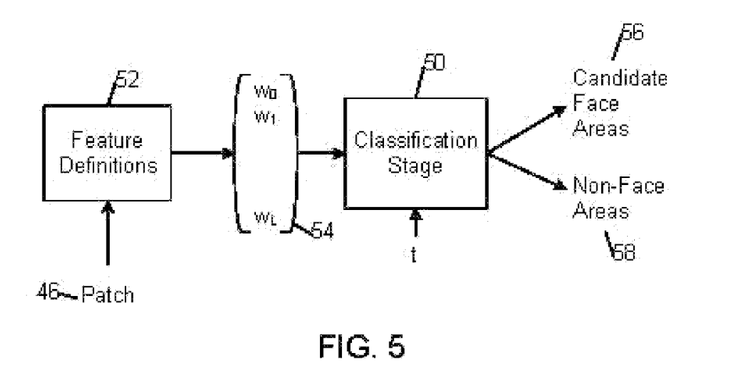
FIG. 5 is a block diagram of an embodiment of a single classification stage in an implementation of the face map module shown in FIG. 4 that is designed to evaluate candidate face patches in an image.

FIG. 5 shows an exemplary embodiment of a single classification stage 50 in an embodiment of the classifier cascade 42. In this embodiment, the image patch 46 is projected into a feature space in accordance with a set of feature definitions 52. The image patch 46 includes any information relating to an area of an input image, including color values of input image pixels and other information derived from the input image needed to compute feature weights. Each feature is defined by a rule that describes how to compute or measure a respective weight ($w_0$, $w_1$, ..., $w_L$) for an image patch that corresponds to the contribution of the feature to the representation of the image patch in the feature space spanned by the set of features 52. The set of weights ($w_0$, $w_1$, ..., $w_L$) that is computed for an image patch constitutes a feature vector 54. The feature vector 54 is input into the classification stage 50. The classification stage 50 classifies the image patch 46 into a set 56 of candidate face areas or a set 58 of non-faces. If the image patch is classification as a face, it is passed to the next classification stage, which implements a different discrimination function.

In some implementations, the classification stage 50 implements a discrimination function that is defined in equation (1):

$$\sum_{\ell=1}^{L} g_\ell h_\ell(u) > 0 \tag{1}$$

where u contains values corresponding to the image patch 46 and $g_\ell$ are weights that the classification stage 50 applies to the corresponding threshold function $h_\ell(u)$, which is defined by:

$$h_\ell(u) = \begin{cases} 1, & \text{if } p_\ell w_\ell(u) > p_\ell t_\ell \\ 0, & \text{otherwise} \end{cases} \tag{2}$$

The variable $p_\ell$ has a value of +1 or −1 and the function w(u) is an evaluation function for computing the features of the feature vector 54.

Additional details regarding the construction and operation of the classifier cascade 42 can be obtained from U.S. Pat. No. 7,099,510.

In summary, the classifier cascade 42 processes the patches 46 of the input image 24 through the classification stages ($C_1$, $C_2, \ldots, C_n$), where each image patch is processed through a respective number of the classification stages depending on a per-classifier evaluation of the likelihood that the patch corresponds to human face content.

The face probability generator 44 calculates the probabilities that the patches 46 of the input image 24 correspond to human face content (i.e., the face probability values) in accordance with the respective numbers of classifiers through which corresponding ones of the patches were processed. For example, in one exemplary embodiment, the face probability generator 44 maps the number of unevaluated stages to a respective face probability value, where large numbers are mapped to low probability values and small numbers are mapped to high probability values. The face probability generator 44 calculates the pixel-wise face map 48 from the patch probabilities (e.g., by assigning to each pixel the highest probability of any patch that contains the pixel).

The pixel-wise face probability values typically are processed to ensure that variations in the face probability values are continuous across the face map. In some embodiments, the face probability values in each detected face are smoothly reduced down to zero as the distance from the center of the detected face increases. In some of these embodiments, the face probability of any pixel is given by the original face probability value multiplied by a smooth monotonically decreasing function of the distance from the center of the face, where the function has a value of one at the face center and value of zero a specified distance from the face center. In one exemplary embodiment, a respective line segment through the center of each of the detected faces and oriented according to the in-plane rotation of the detected face is determined. The probability attached to any pixel in a given one of the detected face regions surrounding the respective line segment is then given by the face probability value multiplied by a clipped Gaussian function of the distance from that pixel to the respective line segment. The clipped Gaussian function has values of one on the respective line segment and on a small oval region around the respective line segment; in other regions of the detected face, the values of the clipped Gaussian function decays to zero as the distance from the respective line segment increases.

3. Multi-View Based Face Map Generation

In some embodiments, each of the image patches 46 is passed through at least two parallel classifier cascades that are configured to evaluate different respective facial views. Some of these embodiments are implemented in accordance with one or more of the multi-view face detection methods described in Jones and Viola, "Fast Multi-view Face Detection," Mitsubishi Electric Research Laboratories, MERL-TR2003-96, July 2003 (also published in IEEE Conference on Computer Vision and Pattern Recognition, Jun. 18, 2003).

In these embodiments, the face probability generator 44 determines the face probability values from the respective numbers of classifiers of each cascade through which corresponding ones of the patches were evaluated. For example, in one exemplary embodiment, the face probability generator 44 maps the number of unevaluated classification stages in the most successful one of the parallel classifier cascades, where large numbers are mapped to low probability values and small numbers are mapped to high probability values. In some embodiments, the classifier cascade with the fewest number of unevaluated stages for the given patch is selected as the most successful classifier cascade. In other embodiments, the numbers of unevaluated stages in the parallel stages are normalized for each view before comparing them. The face probability generator 44 calculates the pixel-wise face map 48 from the patch probabilities (e.g., by assigning to each pixel the highest probability of any patch that contains the pixel). The pixel-wise face probability values typically are processed in the manner described in the preceding section to ensure that variations in the face probability values are continuous across the face map. In the resulting face map, face patches have a smooth (e.g. Gaussian) profile descending smoothly from the nominal patch value to the nominal background value across a large number of pixels.

Figure 6:
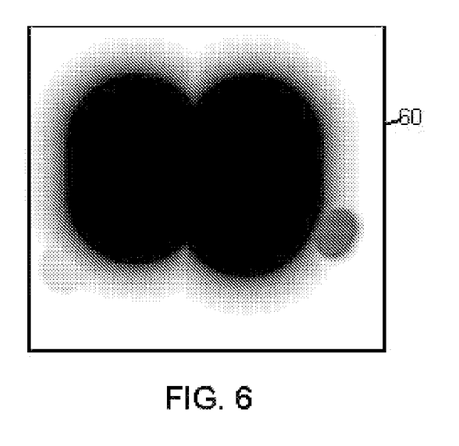
FIG. 6 is a graphical representation of an example of a face map generated by the face map module of FIG. 4 from the input image shown in FIG. 3.

FIG. 6 shows an example of a face map 60 that is generated by the face map module 14 (FIG. 1) from the input image 32 (FIG. 3) in accordance with the multi-view based face map generation process described above. In this face map 60, darker values correspond to higher probabilities that the pixels correspond to human face content and lighter values correspond to lower probabilities that the pixels correspond to human face content.

C. Ascertaining Skin Maps

As explained above, the skin map module 16 ascertains a skin map that includes for each pixel of the input image a respective skin probability value indicating a degree to which the pixel corresponds to human skin (FIG. 2, block 36). A characteristic feature of the skin map is that all pixels of the input image 24 having similar values are mapped to similar respective skin probability values in the skin map. As used herein with respect to pixel values, the term "similar" means that the pixel values are the same or nearly the same and appear visually indistinguishable from one another. This feature of the skin map is important in, for example, pixels of certain human-skin image patches that have colors outside of the standard human-skin tone range. This may happen, for example, in shaded face-patches or alternatively in face highlights, where skin segments may sometimes have a false boundary between skin and non skin regions. The skin map values vary continuously without artificial boundaries even in skin patches trailing far away from the standard human-skin tone range.

Figure 7A:
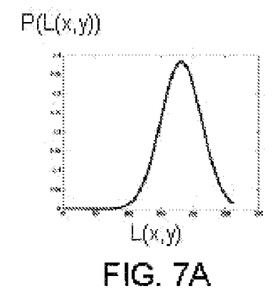
FIGS. 7A, 7B, and 7C show exemplary graphs of human skin tone probabilities for respective channels of the CIE LCH color space.
Figure 7B:
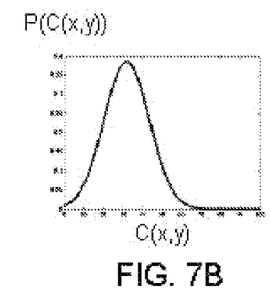
Figure 7C:
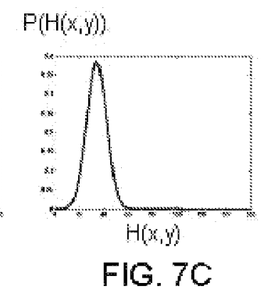

In general, the skin map module 16 may ascertain the skin probability values indicating the degrees to which the input image pixels correspond to human skin in a wide variety of different ways. In a typical approach, the skin map module 16 ascertains the per-pixel human-skin probability values from human-skin tone probability distributions in respective channels of a color space. For example, in some embodiments, the skin map module 16 ascertains the per-pixel human-skin tone probability values from human-skin tone probability distributions in the CIE LCH color space (i.e., P(skin|L), P(skin|C), and P(skin|H)). These human-skin tone probability distributions are approximated by Gaussian normal distributions (i.e., $G(p,\mu,\sigma)$) that are obtained from mean ($\mu$) and standard deviation ($\sigma$) values for each of the p=L, C, and H color channels. In some embodiments, the mean ($\mu$) and standard deviation ($\sigma$) values for each of the p=L, C, and H color channels are obtained from O. Martinez Bailac, "Semantic retrieval of memory color content", PhD Thesis, University Autonoma de Barcelona, 2004. Exemplary human-skin tone probability distributions for the L, C, and H color channels are shown in FIGS. 7A, 7B, and 7C, respectively.

The skin map module 16 ascertains a respective skin probability value for each pixel of the input image 24 by converting the input image 24 into the CIE LCH color space (if necessary), determining the respective skin-tone probability value for each of the L, C, and H color channels based on the corresponding human-skin tone probability distributions, and computing the product of the color channel probabilities, as shown in equation (3):

$$P(skin|L,C,H) \approx G(L, \mu_L, \sigma_L) \times G(C, \mu_C, \sigma_C) \times G(H, \mu_H, \sigma_H) \quad (3)$$

In some embodiments, the skin map values are computed by applying to the probability function P(skin |L,C,H) a range adaptation function that provides a clearer distinction between skin and non-skin pixels. In some of these embodiments, the range adaptation function is a power function of the type defined in equation (4):

$$M_{SKIN}(x, y) = P(skin|L(i), C(i), H(i))^{1/\gamma} \qquad (4)$$

where $\gamma > 0$ and $M_{SKIN}(x, y)$ are the skin map 62 values at location (x, y). In one exemplary embodiment, $\gamma = 32$. The skin map function defined in equation (4) attaches high probabilities to a large spectrum of skin tones, while non-skin features typically attain lower probabilities.

Figure 8:
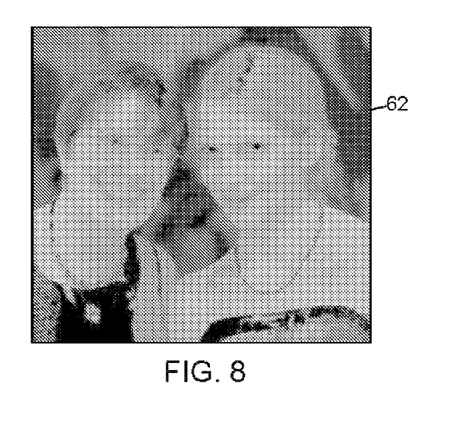
FIG. 8 is a graphical representation of an example of a skin map generated by the skin map module shown in FIG. 1 from the input image shown in FIG. 3.

FIG. 8 shows an example of a skin map that is generated by the skin map module 16 (FIG. 1) from the input image 32 (FIG. 3) in accordance with the skin map generation process described in connection with equations (3) and (4). In this skin map 62, darker values correspond to lower probabilities that the pixels correspond to human skin content and lighter values correspond to higher probabilities that the pixels correspond to human skin content. As shown by a comparison of FIGS. 3 and 8, the skin map 62 distinguishes the pixels of the input image 32 depicting skin from the pixels depicting the pearls and the lace; and within the faces appearing in the input image 32, the skin map 62 distinguishes skin from non-skin features (e.g., the eyes and lips).

D. Enhancing the Input Image

As explained above, the control parameter module 20 and the image enhancement module 22 cooperatively enhance the input image 24 with an enhancement level that varies pixel-by-pixel in accordance with the respective face probability values and the respective skin probability values (FIG. 2, block 38). In this process, the control parameter module 20 produces control parameter values 30 from the measurement values 28 that are output by the attribute extraction modules 14-18. The image enhancement module 22 produces the enhanced image 26 by performing on the input image 24 one or more image processing operations that are controlled by the control parameter values 30.

In general, the control parameter module 20 and the image enhancement module 22 may be configured to perform a wide variety of face and skin sensitive enhancements on the input image 24. The embodiments that are described in detail below, for example, are configured to perform face and skin sensitive sharpening of the input image 24 and face-sensitive contrast enhancement of the input image.

In some embodiments, the control parameter module 20 determines a global control parameter value based on global features of the input image 24. The control parameter module 20 then determines for each pixel of the input image 24 a respective local control parameter value that corresponds to a respective modification of the global parameter value in accordance with the respective face probability values and the respective skin probability values. The image enhancement module 22 enhances the input image 24 in accordance with the local control parameter values.

1. Sharpening the Input Image

The embodiments of the control parameter module 20 and the image enhancement module 22 that are described in detail below are configured to sharpen the input image 24 with a sharpening level that varies pixel-by-pixel in accordance with the respective face probability values in the face map and the respective skin probability values in the skin map. In some embodiments, the control parameter module 20 computes for each pixel of the input image a respective sharpening parameter value that controls the amount of sharpening that is applied to the pixel.

The sharpening parameter values that are computed by the control parameter module 20 are configured to cause the image enhancement module 22 to sharpen the input image 24 with sharpening levels in a high sharpening level range at pixel locations associated with skin probability values in a low skin probability range. This type of sharpening satisfies the typical desire to aggressively sharpen non-human-skin toned features (e.g., eyes, lips, hairline, trees, and grass) inside and outside human faces.

The sharpening parameter values that are computed by the control parameter module 20 also are configured to cause the image enhancement module 22 to sharpen the input image with sharpening levels in a low sharpening level range at pixel locations associated with skin probability values in a high skin probability range and face probability values in a high face probability range. In this case, the low sharpening level range is below the high sharpening level range and the high skin probability range is above the low skin probability range. This type of sharpening satisfies the typical desire to less aggressively sharpen (or not sharpen at all) human-skin toned features within human faces.

The sharpening parameter values that are computed by the control parameter module 20 also are configured to cause the image enhancement module 22 to sharpen the input image 24 with sharpening levels in an intermediate sharpening level range at pixel locations associated with skin probability values in the high skin probability range and face probability values in a low face probability range. In this case, the intermediate sharpening level range is between the high and low sharpening level ranges, and the low face probability range is below the high face probability range. This type of sharpening gives flexibility in sharpening features outside of human faces. For these pixels, the decision of whether or not to sharpen human-skin toned features is unclear because these features may be features, such as autumn leaves and dry grass, which observers typically want to appear sharp and crisp or they may be features, such as a missed human face or other human skin content, which observers typically do not want sharpened.

Figure 9:
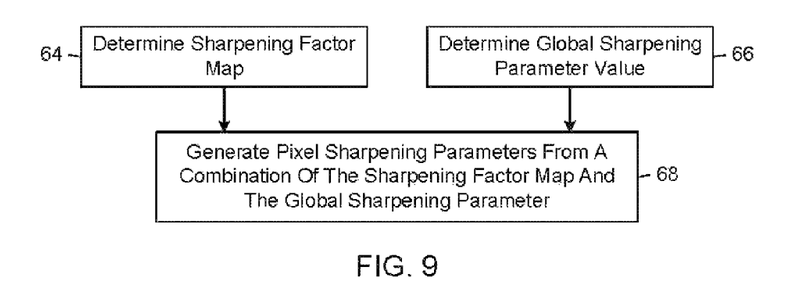
FIG. 9 is a flow diagram of an embodiment of a method by which the control parameter module shown in FIG. 1 generates control parameter values for enhancing the input image of FIG. 1.

FIG. 9 shows an embodiment of a method in accordance with which the control parameter module 20 computes a sharpening factor map that contains for each pixel of the input image 24 a respective sharpening factor that controls the sharpening levels applied by the image enhancement module 22 in the manner described in the preceding paragraphs. In this embodiment, the control parameter module 20 determines the sharpening factor map (FIG. 9, block 64), determines a global sharpening parameter (FIG. 9, block 66), and generates pixel sharpening parameters from a combination of the sharpening factor map and the global sharpening parameter value (FIG. 9, block 68).

In some of the embodiments in accordance with the method of FIG. 9, the sharpening factors g(f(x,y),s(x,y)) are computed in accordance with equation (5):

$$g(f(x, y), s(x, y)) = 1 - \frac{(1 + f(x, y))}{2} \cdot \begin{cases} 0 & \text{if } s(x, y) < Lth(f(x, y)) \\ 1 & \text{if } s(x, y) > Hth(f(x, y)) \\ \frac{(s(x, y) - Lth(f(x, y)))}{Hth(f(x, y)) - Lth(f(x, y))} & \text{Otherwise} \end{cases} \qquad (5)$$

where f(x,y) is the face map probability for pixel (x,y), s(x,y) is the skin map probability for pixel (x,y), Lth(f(x,y)) is a lower skin probability threshold, and Hth(f(x,y)) is an upper skin probability threshold. In general, both Lth(f(x,y)) and Hth(f(x,y)) may vary depending on face probability values.

In some embodiments, the upper skin threshold is set to an empirically determined constant value. In one exemplary embodiment, the upper skin threshold is set of 0.69. In some embodiments, the sharpening of features in detected faces (e.g. eyes, lips etc) is lower than the sharpening of details outside of the detected faces (e.g. trees and buildings). In some of these embodiments, the adaptive sharpening is implemented by Hth(f(x,y))=$a_H$+$b_H$·f(x,y). In one embodiment, $a_H$=0.6836 and $b_H$=0. In another embodiment, $a_H$=0.6836 and $b_H$=−0.03.

In some embodiments, the lower skin threshold Lth(f(x,y)) is a decreasing function of the face probability value f(x,y), which adapts the lower skin threshold to more conservatively sharpening of facial pixels. In some of these embodiments, the lower skin threshold is give by:

$$Lth(f(x,y))=a-b \cdot f(x,y) \quad (6)$$

where a and b are empirically determined positive-valued constants. In one exemplary embodiment, a=0.61 and b=−0.008.

Figure 10:
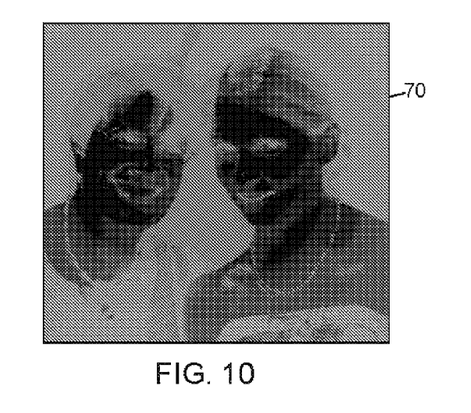
FIG. 10 is a graphical representation of an example of a sharpening factor map generated by the control parameter module shown in FIG. 1 from the face map of FIG. 6 and the skin map of FIG. 8 in accordance with the method of FIG. 9.

FIG. 10 shows an example of a sharpening factor map 70 that is generated by the control parameter module 20 from the face map 60 shown in FIG. 6 and the skin map 62 shown in FIG. 8 in accordance with the sharpening factor generation process described above in connection with equations (5) and (6).

In some embodiments the sharpening factor values in the sharpening factor map are combined with a global sharpening parameter, which is used to control or tune the sharpening levels that are applied to the pixels of the input image 24 to produce the enhanced image 26. The sharpening enhancement process to be tuned may be, for example, any type of spatial sharpening filter, including but not limited to an unsharp-masking filter, a high-pass filter, a high boost filter, a differences of Gaussians based filter, and a Laplacian of Gaussian filter.

In some embodiments, the image enhancement process to be tuned is a non-linear smoothing and sharpening filter that combines bilateral filtering and generalized unsharp-masking. This filter may be derived from a low pass filter of the type defined in equation (7):

$$Out(x, y) = \sum_{ij} K_{ij} \cdot In(x - i, y - j) \quad (7)$$

where (x,y) specifies the coordinate locations of the pixels and the kernel is designed such that $$\sum_{ij} K_{ij} = 1.$$

In particular, the low-pass filter defined in equation (7) may be re-written as $$Out(x, y) = In(x, y) + \sum_{ij} K_{ij} \cdot (In(x - i, y - j) - In(x, y)) \quad (8)$$

The corresponding bilateral filter is given by equation (9):

$$Out(x, y) = In(x, y) + \sum_{ij} K_{ij} \cdot \psi(In(x - i, y - j) - In(x, y)) \quad (9)$$

where the function $\psi(z=In(x-i,y-j)-In(x,y))$ usually a non-linear function. Note that if $\psi(z)=z$, equation (9) becomes equation (8). Similarly if $\psi(z)=-\lambda \cdot z$, equation (9) becomes $$Out(x, y) = (1 + \lambda) \cdot In(x, y) - \lambda \sum_{ij} K_{ij} \cdot In(x - i, y - j) \quad (10)$$

which is a linear unsharp mask convolution filter in which λ is a sharpness parameter. In the illustrated embodiments, the image enhancement module 22 sharpens the input image in accordance with equation (9) and equation (11), which defines ψ(z) as follows:

$$\psi(z) = R \cdot \begin{cases} z & |z| < Th \\ \text{sign}(z) \cdot Th + \lambda \cdot (Th - z) & \text{otherwise} \end{cases} \quad (11)$$

In equation (11), Th is a noise threshold that determines the local deviation level that will be smoothed (should be high in case of strong noise). The sharpness parameter λ determines the extent of sharpness that is introduced into significant edges (higher values result in sharper images). The parameter R is a radicality parameter that determines how radical the enhancement should be: when R=1, the other parameters operate at their nominal values; when R=0, the output equals the input; when 0<R<1, the output is a weighted average between these two extremes.

In some embodiments, the noise threshold $Th_{NOMINAL}$ is given by equation (12):

$$Th_{NOMINAL} = \begin{cases} 4 \cdot N^S & N^S < 3 \\ 12 & 3 \leq N^S \end{cases} \quad (12)$$

where the noise attribute $N^S$ is estimated as the mean absolute high-pass content (HP(x)) over S, as defined in equation (13):

$$N^S = \int_{z \in S} |HP(z)| dz \quad (13)$$

In some embodiments, the smooth scene regions (S) are defined as regions with consistently low LP(z) activity (i.e., the values of LP(z) in the smooth region and its V-vicinity are lower than a threshold Tsm). Highlights and shadows are excluded from S due to possible tone saturation, which might introduce textures into S. That is, $$S = \{t | (G^H > In(t) > G^L) \text{ and } \{\forall x \in [t-V, t+V], LP(z) < T_{sm}\}\} \quad (14)$$

Additional details regarding the estimation of the noise attribute $N^S$ can be found in application Ser. No. 11/388,152, which was filed on Mar. 22, 2006, and is incorporated herein by reference. In some embodiments, the sharpness parameter λ is calculated in accordance with equation (15):

$$\lambda = \lambda_{GLOBAL} \cdot g(f(x,y), s(x,y)) \quad (15)$$

where g(f(x,y),s(x,y)) is defined in equation (5) and $\lambda_{GLOBAL}$ is a global sharpening parameter that is given by equation (16):

$$\lambda_{GLOBAL} = \begin{cases} 2.5 & Sh^F < 0.1 \\ 2.5 - 7.5*(Sh^F - 0.1) & 0.1 \le Sh^F < 0.3 \\ 1 & 0.3 \le Sh^F \end{cases} \quad (16)$$

where $Sh^F$ is a sharpness measure. In some embodiments, the sharpness measure is determined in accordance with the method described in application Ser. No. 10/835,910, which was filed on Apr. 29, 2004, and is incorporated herein by reference. In other embodiments, the sharpness measure amounts to averaging frequency band ratios over regions more likely to be sharp edges. In some of these embodiments, the sharpness measure is estimated by equation (17):

$$Sh^F = \int_{z \in F} \left(\frac{HP(z)}{LP(z)}\right)^2 dz \quad (17)$$

where F is a feature region characterized by a threshold $T_{sh}$ in the local low-pass feature, as defined in equation (18):

$$F = \{z | LP(z) > T_{sh}\} \quad (18)$$

The global sharpening parameter ($\lambda_{GLOBAL}$), which is computed for each input image, takes into account the different levels of quality in each image. Thus, with respect to two different images that describe the same scene but differ in quality (e.g., one noisy and one clean, or one sharp and one blurry), the sharpness parameter $\lambda$ will be different, even if the skin and face values are the same.

2. Contrast-Enhancing the Input Image

The embodiments that are described in detail below are configured to perform face-sensitive contrast enhancement of the input image. In general, the contrast enhancement may be performed instead or in addition to the sharpening enhancement described in the preceding section.

Figure 11:
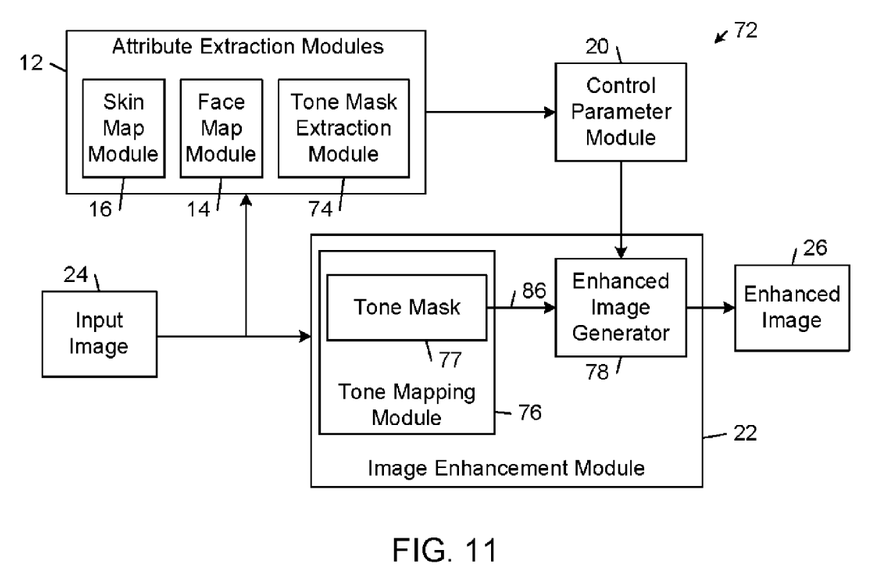
FIG. 11 is a block diagram of an embodiment of the image enhancement system of FIG. 1.

FIG. 11 shows an embodiment 72 of the image enhancement system 10 in which one of the other attribute extraction modules 18 is a tone mask extraction module 74, and the image enhancement module 22 includes a tone mapping module 76 and a enhanced image generator 78.

Figure 12:
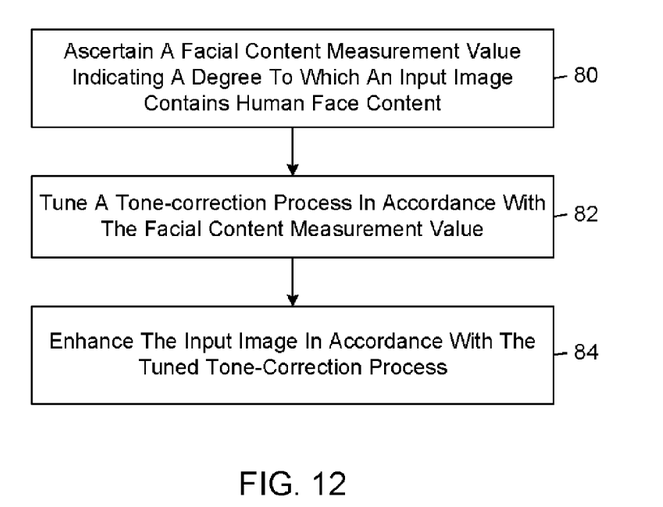
FIG. 12 is a flow diagram of an embodiment of an image enhancement method.

FIG. 12 shows an embodiment of a method in accordance with which the control parameter module 20 and the image enhancement module 22 cooperatively enhance the input image 24 to produce the enhanced image 26.

The control parameter module 20 ascertains a facial content measurement value indicating a degree to which the input image 24 contains human face content (FIG. 12, block 80). In general, the control parameter module 20 may ascertain the facial content measurement value in any of a wide variety of different ways. In some embodiments, the control parameter module 20 ascertains the facial measurement value by calculating the average of the values in the face map that is generated by the face map module 14. The resulting average value represents an estimate of the proportion of the input image 24 occupied by facial content.

The control parameter module 20 then tunes a tone-correction process in accordance with the facial content measurement value (FIG. 12, block 82). In some embodiments, the control parameter module 20 determines a weight that is used by the image enhancement module 22 to control the amount of an image-dependent (though not necessarily face-sensitive) default contrast enhancement 86 that should be applied to the input image 24. In the illustrated embodiments, the amount of the applied default contrast enhancement decreases with the value of the weight determined by the control parameter value. In general, the weight may be any function that maps facial content measurement values $\Gamma$ to weight values $\nu(\Gamma)$. In general, the weight values may take on any positive or negative value. In one exemplary embodiment, the weight function ($\nu(\Gamma)$) is given by equation (19):

$$\nu(\Gamma) = \begin{cases} 1 & \text{if } \Gamma > \theta_F \\ 0 & \text{if } \Gamma \le \theta_F \end{cases} \quad (19)$$

where $\theta_F$ is an empirically determined threshold. In some exemplary embodiments $\theta_F = 0.15$.

The image enhancement module 22 enhances the input image 24 with an image-dependent default tone mapping module 76 that depends on a tone mask 77 that is extracted by the tone extraction module 74. The enhanced image generator 78 then enhances the input image 24 based on the image-dependent weight received from the control parameter module 20 and the tone-corrected pixel values received from the tone mapping module 76.

The tone mask extraction module 74 generates a tone mask of the input image 24. In some embodiments, the tone mask extraction module 74 generates the tone mask by performing an iterative operation on the input image 74. For instance, some embodiments generate the tone mask by using an iterative process (such as a Retinex process) that makes assumptions about the human visual system. Other embodiments generate this mask by performing a non-iterative operation on the input image 74. For example, some embodiments perform a low-pass filtering operation on the input image 74 to generate the tone mask (see, e.g., the embodiment described in connection with FIG. 2 of U.S. Pat. No. 6,813,041).

The tone mapping module 76 modifies the pixel color values in the input image 24 through linear or non-linear combinations of the tone mask values and the pixel color values in the input image 24. In other embodiments, the tone mapping module 76 modifies the pixel color values in the input image 24 non-linearly. Among the types of non-linear operations that may be used to modify the input image pixel color values are rotated scaled sinusoidal functions, sigmoidal functions, and exponential functions that have input image pixel color values as part of their base (see, e.g., the embodiment described in connection with FIG. 3 of U.S. Pat. No. 6,813,041).

The enhanced image generator 78 enhances the input image 24 based on the face-sensitive weight received from the control parameter module 20 and the tone-corrected pixel values received from the tone mapping module 76. In some exemplary embodiments, the enhanced image generator 78 calculates the values of the enhanced image pixels from a weighted combination of the values of the input image pixels and the values (T(x,y)) of the tone-corrected pixels 86 in accordance with equation (20):

$$Out(x,y) = \nu(\Gamma) \cdot T(x,y) + (1-\nu(\Gamma)) \cdot In(x,y) \quad (20)$$

III. Exemplary Architectures of the Image Processing Systems

Embodiments of the image enhancement system 10 (including the embodiment 72 shown in FIG. 11) may be implemented by one or more discrete modules (or data processing components) that are not limited to any particular hardware, firmware, or software configuration. In the illustrated embodiments, the modules of the image enhancement system 10 may be implemented in any computing or data processing environment, including in digital electronic circuitry (e.g., an application-specific integrated circuit, such as a digital signal processor (DSP)) or in computer hardware, firmware, device driver, or software. In some embodiments, the functionalities of the modules of the image enhancement system 10 are combined into a single data processing component. In some embodiments, the respective functionalities of each of one or more of the modules of the image enhancement system 10 are performed by a respective set of multiple data processing components.

In some implementations, process instructions (e.g., machine-readable code, such as computer software) for implementing the methods that are executed by the embodiments of the image enhancement system 10, as well as the data it generates, are stored in one or more machine-readable media. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM.

In general, embodiments of the image enhancement system 10 may be implemented in any one of a wide variety of electronic devices, including desktop and workstation computers, television monitors, projection displays, or video cards connected to such large screens displays, video recording devices (e.g., VCRs and DVRs), cable or satellite set-top boxes capable of decoding and playing paid video programming, and digital camera devices. Due to its efficient use of processing and memory resources, some embodiments of the image enhancement system 10 may be implemented with relatively small and inexpensive components that have modest processing power and modest memory capacity. As a result, these embodiments are highly suitable for incorporation in application environments that have significant size, processing, and memory constraints, including but not limited to printers, handheld electronic devices (e.g., a mobile telephone, a cordless telephone, a portable memory device such as a smart card, a personal digital assistant (PDA), a solid state digital audio player, a CD player, an MCD player, a game controller, a pager, and a miniature still image or video camera), digital cameras, and other embedded environments.

Figure 13:
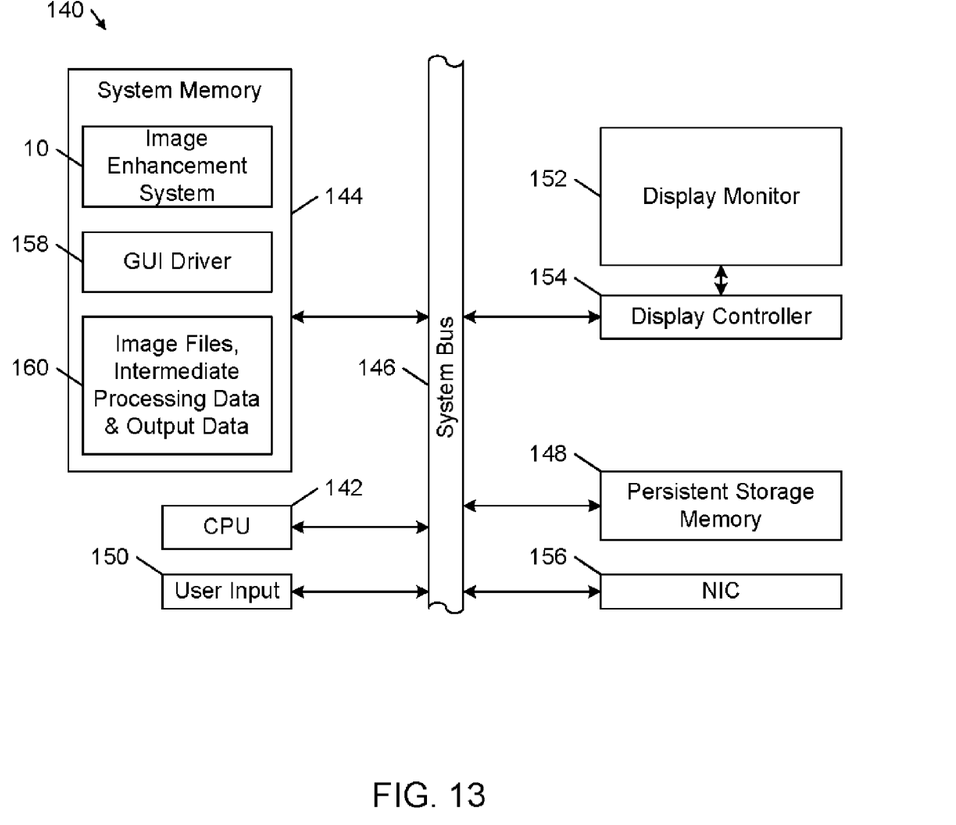
FIG. 13 is a block diagram of an embodiment of a computer system that is programmable to implement an embodiment of the image enhancement system shown in FIG. 1.

FIG. 13 shows an embodiment of a computer system 140 that incorporates an embodiment of the image enhancement system 10. The computer system 140 may be implemented by a standalone computer (e.g., a desktop computer, workstation computer, or a portable computer) or it may be incorporated in another electronic device (e.g., a printer or a digital camera). The computer system 140 includes a processing unit 142 (CPU), a system memory 144, and a system bus 146 that couples processing unit 142 to the various components of the computer system 140. The processing unit 142 typically includes one or more processors, each of which may be in the form of any one of various commercially available processors. The system memory 144 typically includes a read only memory (ROM) that stores a basic input/output system (BIOS) that contains start-up routines for the computer system 140 and a random access memory (RAM). The system bus 146 may be a memory bus, a peripheral bus or a local bus, and may be compatible with any of a variety of bus protocols, including PCI, VESA, Microchannel, ISA, and EISA. The computer system 140 also includes a persistent storage memory 148 (e.g., a hard drive, a floppy drive, a CD ROM drive, magnetic tape drives, flash memory devices, and digital video disks) that is connected to the system bus 146 and contains one or more computer-readable media disks that provide non-volatile or persistent storage for data, data structures and computer-executable instructions.

A user may interact (e.g., enter commands or data) with the computer system 140 using one or more input devices 150 (e.g., a keyboard, a computer mouse, a microphone, joystick, and touch pad). Information may be presented through a graphical user interface (GUI) that is displayed to the user on a display monitor 152, which is controlled by a display controller 154. The computer system 140 also typically includes peripheral output devices, such as speakers and a printer. One or more remote computers may be connected to the computer system 140 through a network interface card (NIC) 156.

As shown in FIG. 13, the system memory 144 also stores an embodiment of the image enhancement system 10, a GUI driver 158, and a database 160 containing image files corresponding to the input and enhancement images 24, 26, intermediate processing data, and output data. In some embodiments, the image enhancement system 10 interfaces with the GUI driver 158 and the user input 150 to control the creation of the enhanced image 26. In some embodiments, the computer system 140 additionally includes a graphics application program that is configured to render image data on the display monitor 152 and to perform various image processing operations on the enhanced image 26.

IV. Conclusion

The embodiments that are described in detail herein are capable of enhancing images in face and skin sensitive ways. At least some of these embodiments enhance images in ways that avoid artifacts and other undesirable problems that arise as a result of enhancing an image based on segmentations of the image into discrete subject matter regions. At least some of these embodiments are capable of adjusting default control parameters in image-dependent ways.

Other embodiments are within the scope of the claims. For example, in some embodiments, a sequence of images (e.g., a sequence of video frames) may be processed by the image processing system 10. In some of these embodiments, a respective face map and a respective skin map are calculated for each of the images in the sequence in accordance with the methods described above.

What is claimed is:

1. A method, comprising:
   calculating a face map comprising for each pixel of an input image a respective face probability value indicating a degree to which the pixel corresponds to a human face, wherein variations in the face probability values are continuous across the face map;
   ascertaining a skin map comprising for each pixel of the input image a respective skin probability value indicating a degree to which the pixel corresponds to human skin; and
   enhancing the input image with an enhancement level that varies pixel-by-pixel in accordance with the respective face probability values and the respective skin probability values;
   wherein the calculating, the ascertaining, and the enhancing are performed by a computer system.

2. The method of claim 1, wherein the calculating comprises:
   processing patches of the input image through a cascade of classifiers, wherein each patch is processed through a respective number of the classifiers depending on a per-classifier evaluation of the likelihood that the patch corresponds to a human face; and calculating the face probability values for the pixels of the input image in accordance with the respective numbers of classifiers through which corresponding ones of the patches were processed.

3. The method of claim 2, wherein the calculating comprises processing each of the patches through at least two parallel classifier cascades that are configured to evaluate different respective facial views.

4. The method of claim 3, wherein the calculating comprises determining the face probability values from the respective numbers of classifiers of each cascade through which corresponding ones of the patches were evaluated.

5. The method of claim 1, wherein the ascertaining comprises ascertaining per-pixel skin tone probabilities from skin tone probability distributions in respective channels of a color space.

6. The method of claim 1, wherein the enhancing comprises sharpening the input image with a sharpening level that varies pixel-by-pixel in accordance with the respective face probability values and the respective skin probability values.

7. The method of claim 6, wherein the sharpening comprises:
sharpening the input image with sharpening levels in a high sharpening level range at pixel locations associated with skin probability values in a low skin probability range;
sharpening the input image with sharpening levels in a low sharpening level range at pixel locations associated with skin probability values in a high skin probability range and face probability values in a high face probability range, the low sharpening level range being below the high sharpening level range and the high skin probability range being above the low skin probability range; and
sharpening the input image with sharpening levels in an intermediate sharpening level range at pixel locations associated with skin probability values in the high skin probability range and face probability values in a low face probability range, the intermediate sharpening level range being between the high and low sharpening level ranges and the low face probability range being below the high face probability range.

8. The method of claim 1, further comprising, for each pixel of the input image, determining a respective control parameter value from the respective face probability value and the respective skin probability value.

9. The method of claim 8, wherein the determining is performed without regard to any classification of the face map into one or more regions of human face content and without regard to any classification of the skin map into one or more regions of human skin content.

10. The method of claim 8, wherein the determining comprises determining for each pixel of the input image a respective sharpening parameter value from the respective face probability value and the respective skin probability value, and the enhancing comprises sharpening the input image with a sharpening level that varies pixel-by-pixel in accordance with the respective control parameter values.

11. The method of claim 8, wherein the determining comprises inputting the face probability values and the skin probability values into a continuous function that maps each pair of corresponding face and skin probability values to a respective sharpening parameter.

12. The method of claim 1, wherein the enhancing comprises determining one or more control parameter values in accordance with one or more image enhancement processes, and modifying the one or more control parameter values in accordance with the respective face probability values and the respective skin probability values.

13. The method of claim 1, further comprising determining a global control parameter value based on global features of the input image and determining for each pixel of the input image a respective local control parameter value that corresponds to a respective modification of the global parameter value in accordance with the respective face probability values and the respective skin probability values, wherein the enhancing comprises enhancing the input image in accordance with the local control parameter values.

14. The method of claim 1, further comprising estimating from the face map a facial content measurement value indicating a degree to which the input image contains human face content, wherein the enhancing comprises tuning a tone-correction process in accordance with the facial content measurement value.

15. The method of claim 14, wherein the tuning comprises controlling a contribution of a default tone-corrected image to an output tone-corrected image based on the facial content measurement value, wherein the default tone-corrected image is derived from input pixel values entered into the tone-correction process.

16. The method of claim 15, wherein the enhancing comprises determining at least one weight from the facial content measurement value, and calculating a weighted combination of the default tone-corrected image and the input pixel values in accordance with the at least one weight.

17. A method, comprising:
ascertaining a facial content measurement value indicating a degree to which an input image contains human face content, wherein the ascertaining comprises determining the facial content measurement value from a determined proportion of the input image that is occupied by facial content;
tuning a tone-correction process in accordance with the facial content measurement value; and
enhancing the input image in accordance with the tuned tone-correction process;
wherein the calculating, the ascertaining, and the enhancing are performed by a computer system.

18. The method of claim 17, further comprising deriving a default tone-corrected image from input pixel values entered into a tone-correction process, wherein the tuning comprises controlling a contribution of the default tone-corrected image to an output tone-corrected image based on the facial content measurement value.

19. A method, comprising:
ascertaining a facial content measurement value indicating a degree to which an input image contains human face content;
deriving a default tone-corrected image from input pixel values entered into a tone-correction process;
tuning a tone-correction process in accordance with the facial content measurement value, wherein the tuning comprises controlling a contribution of the default tone-corrected image to an output tone-corrected image based on the facial content measurement value; and
enhancing the input image in accordance with the tuned tone-correction process, wherein the enhancing comprises determining at least one weight from the facial content measurement value, and calculating a weighted combination of the default tone-corrected image and the input pixel values in accordance with the at least one weight.

20. The method of claim 19, wherein the determining comprises applying a minimum facial content threshold to the facial content measurement value and setting the at least one weight such that the contribution of the default tone-corrected image is reduced in response to a determination that the facial content measurement value meets the minimum facial content threshold.

21. A system, comprising:
a memory storing processor-readable instructions;
a processor coupled to the memory, operable to execute the instructions, and based at least in part on the execution of the instructions operable to perform operations comprising
calculating a face map comprising for each pixel of an input image a respective face probability value indicating a degree to which the pixel corresponds to a human face, wherein variations in the face probability values are continuous across the face map;
ascertaining a skin map comprising for each pixel of the input image a respective skin probability value indicating a degree to which the pixel corresponds to human skin; and
enhancing the input image with an enhancement level that varies pixel-by-pixel in accordance with the respective face probability values and the respective skin probability values.

22. The system of claim 21, wherein, based at least in part on the execution of the instructions the processor is operable to perform operations comprising determining, for each pixel of the input image, a respective control parameter value from the respective face probability value and the respective skin probability value, wherein the control parameter module determines the respective control parameter values without regard to any classification of the face map into one or more regions of human face content and without regard to any classification of the skin map into one or more regions of human skin content.

23. The system of claim 21, wherein based at least in part on the execution of the instructions the processor is operable to perform operations comprising determining one or more control parameter values in accordance with one or more image enhancement processes, and modifies the one or more control parameter values in accordance with the respective face probability values and the respective skin probability values.

24. The system of claim 21, wherein, based at least in part on the execution of the instructions the processor is operable to perform operations comprising estimating from the face map a facial content measurement value indicating a degree to which the input image contains human face content, and the image enhancement module tunes a tone-correction process in accordance with the facial content measurement value.

25. A system, comprising:
a memory storing processor-readable instructions;
a processor coupled to the memory, operable to execute the instructions, and based at least in part on the execution of the instructions operable to perform operations comprising
ascertaining a facial content measurement value indicating a degree to which an input image contains human face content, wherein the ascertaining comprises determining the facial content measurement value from a determined proportion of the input image that is occupied by facial content;
tuning a tone-correction process in accordance with the facial content measurement value; and
enhancing the input image in accordance with the tuned tone-correction process.

26. The system of claim 25, wherein, based at least in part on the execution of the instructions the processor is operable to perform operations comprising deriving a default tone-corrected image from input pixel values entered into a tone-correction process, wherein the tuning comprises controlling a contribution of the default tone-corrected image to an output tone-corrected image based on the facial content measurement value.

27. A non-transitory machine readable medium storing machine-readable instructions causing a machine to perform operations comprising:
calculating a face map comprising for each pixel of an input image a respective face probability value indicating a degree to which the pixel corresponds to a human face, wherein variations in the face probability values are continuous across the face map;
ascertaining a skin map comprising for each pixel of the input image a respective skin probability value indicating a degree to which the pixel corresponds to human skin; and
enhancing the input image with an enhancement level that varies pixel-by-pixel in accordance with the respective face probability values and the respective skin probability values.

28. A non-transitory machine readable medium storing machine-readable instructions causing a machine to perform operations comprising, comprising:
ascertaining a facial content measurement value indicating a degree to which an input image contains human face content, wherein the ascertaining comprises determining the facial content measurement value from a determined proportion of the input image that is occupied by facial content;
tuning a tone-correction process in accordance with the facial content measurement value; and
enhancing the input image in accordance with the tuned tone-correction process.

29. The method of claim 1, wherein the ascertaining comprises mapping the pixels of the input image to respective skin probability values in the skin map independently of positions of the pixels in the input image.

* * * * *

UNITED STATES PATENT AND TRADEMARK OFFICE
CERTIFICATE OF CORRECTION

| | | |
|---|---|---|
| PATENT NO. | : 8,031,961 B2 | Page 1 of 1 |
| APPLICATION NO. | : 11/754711 | |
| DATED | : October 4, 2011 | |
| INVENTOR(S) | : Hila Nachlieli et al. | |

It is certified that error appears in the above-identified patent and that said Letters Patent is hereby corrected as shown below:

In column 19, line 40, in Claim 23, delete "wherein" and insert -- wherein, --, therefor.

In column 20, line 41, in Claim 28, delete "comprising, comprising:" and insert -- comprising: --, therefor.

Signed and Sealed this
Tenth Day of July, 2012

David J. Kappos
*Director of the United States Patent and Trademark Office*